March 19, 1957

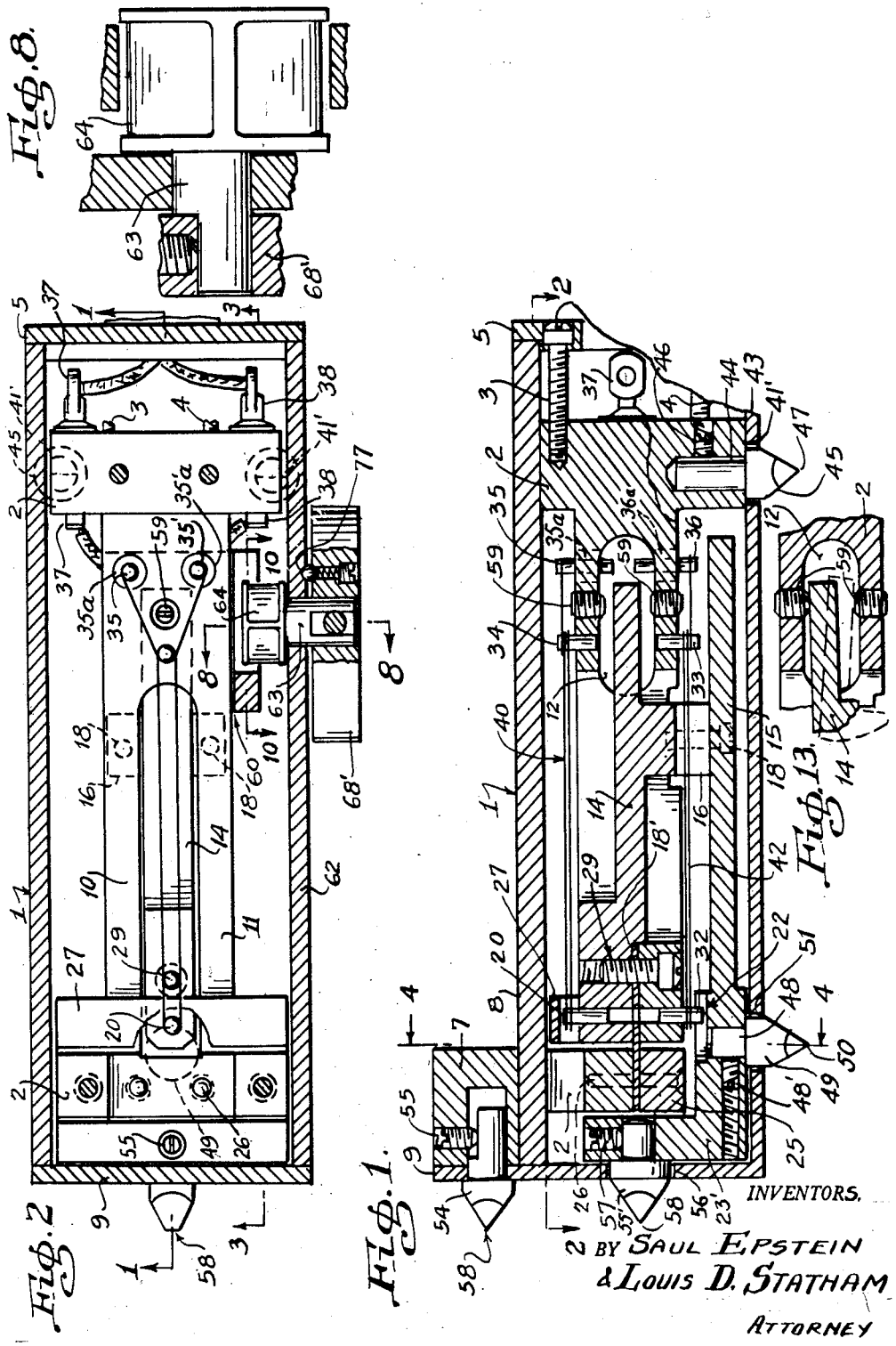

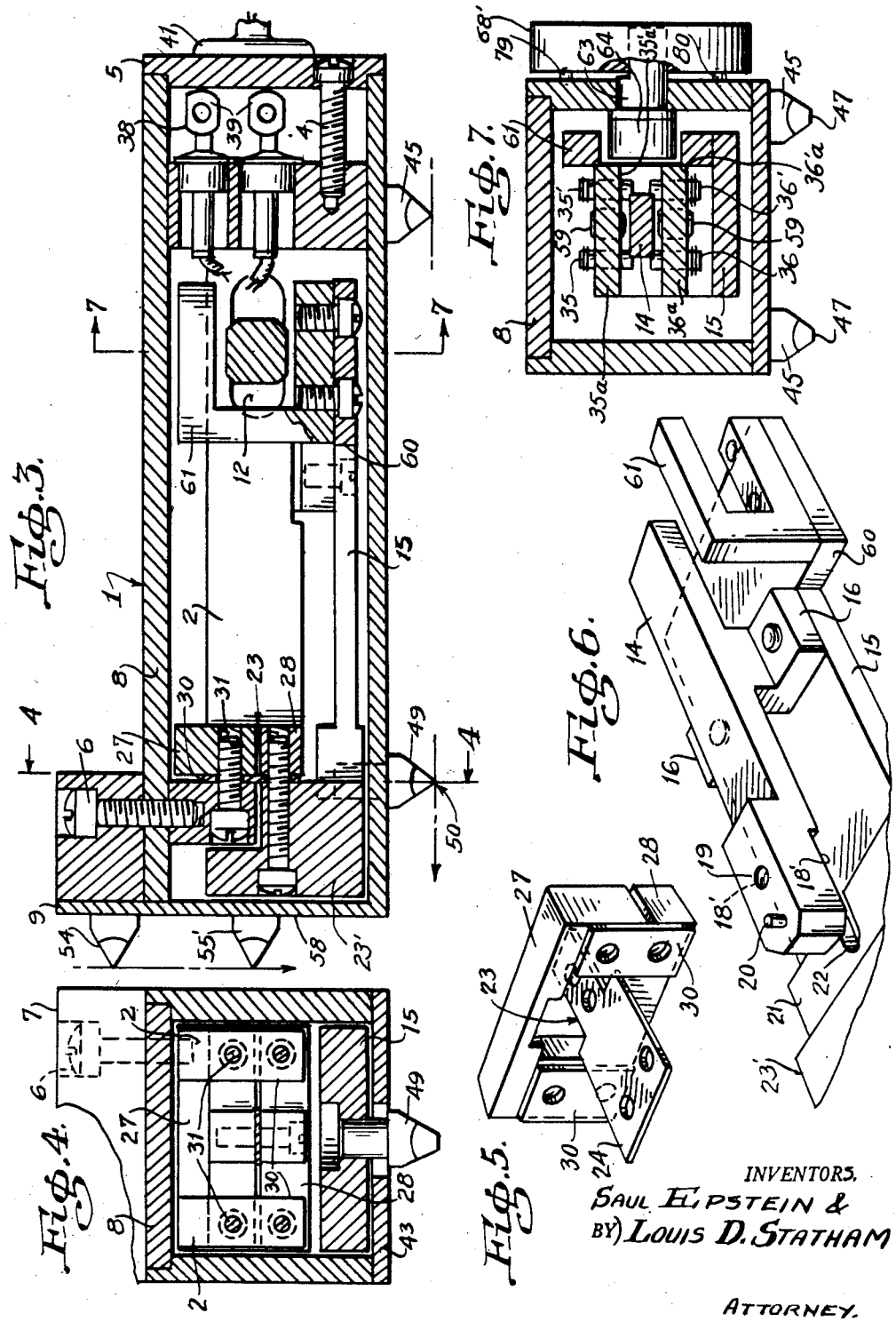

S. EPSTEIN ET AL 2,785,470

STRAIN GAGE

Filed Aug. 16, 1952

INVENTORS.
SAUL EPSTEIN &
LOUIS D. STATHAM
By
ATTORNEY.

United States Patent Office 2,785,470
Patented Mar. 19, 1957

2,785,470

STRAIN GAGE

Saul Epstein, Sherman Oaks, and Louis D. Statham, Beverly Hills, Calif., assignors to Statham Laboratories, Inc., Los Angeles, Calif., a corporation of California Application August 16, 1952, Serial No. 304,816

27 Claims. (Cl. 33—147)

This application is a continuation-in-part of application Serial No. 288,672, filed May 19, 1952, now Patent No. 2,697,158.

This invention relates to a strain gage of the unbonded electrical resistance wire type, now known quite generally to engineers as the Statham gage. Such gages have been described in United States Letters Patent Nos. 2,453,549 and 2,573,286.

A true strain gage, as understood in the science of stress analysis, is defined as a device employed to measure linear deformation, over a given gage length, occurring in the material of a structure during the loading of the structure. Such an instrument must be able to report the percentage change in a determined linear distance between two points in the structure caused by the application of the load to the structure. This is essential due to the mathematical definition of the strain in a loaded structure as the change per unit length caused by the loading.

It is an object of our invention to provide a strain gage which need not, but may, be clamped or otherwise rigidly affixed to the structure undergoing load.

It is a further object of our invention to provide a strain gage such that the application of a force holding the strain gage to the structure, whose strain is to be measured, does not affect or influence the gage operation and need not be compensated for.

In many such gages, as in our gage, the variation of the strain is measured by a consequent variation in the separation of two points on the gage, means being provided to measure some parameter responsive to the separation.

It appears, therefore, that the utility of the gage is determined by the permissible separation of the points which separation is thus controlled by the mechanical construction of the gage. Usually this separation is made either side of a neutral position, i. e., the unloaded position of the gage, to permit of using a gage to measure compressive as well as tensile strain.

It is an object of our invention to so design a gage that the range of motion, i. e., the magnitude of this separation on using the gage either for compressive or tensile stresses, may be made greater than the permissible separation on either side of the neutral position of the gage.

It is a further object of our invention to limit the direction of the separation at will to be either a shortening or a lengthening of the separation or if desired to permit both a lengthening or shortening of the separation.

It is an object of our invention to design a strain gage of the above characteristics employing unbonded electrical strain sensitive resistance wires.

It is a further object of our invention to connect the wires to said spaced points by a leverage system whose characteristics may be altered to magnify the separation of the points on the structure so that consequent variation in the length of the wires bears a ratio to the degree of separation of the points which ratio may be adjusted at will, and we thus produce a gage with a readily variable gage factor.

In the strain gage of our invention the forces necessary to cause a variation in the length of the strain sensitive wires are small. The gage requires very little force to operate, and therefore the gage may be lightly applied to the structure and even held against the structure by rubber bands or by hand and need not be clamped or otherwise firmly fixed to the structure.

The preferred embodiment of our invention includes a gage having a fixed frame on which an armature is movably mounted, preferably upon a hinge with strain sensitive wire or wires stretched between pins mounted on the movable armature and upon the fixed frame. Supports are mounted in the fixed frame and in the armature so that the gage may be applied to the structure whose strain is to be measured in such manner that when the structure is subjected to strain, the points of support approach or separate to cause the movable member to be moved with respect to the fixed frame member and the strain sensitive wire consequently altered in length.

By mounting the armature on a hinge and positioning the support and one of the wire mountings in such spaced relation upon the armature that the wire mounting is longitudinally spaced from the support, a mechanical advantage is introduced into the gage so that the pin moves (and the wire length is consequently altered) to a degree which is greater or less, if desired, than the displacement of the support upon application of the load. Thus the movement of the movable support mounted on the movable member may be transformed into an alteration of wire length and consequently the resistance of the wire by a factor (known herein as the gage factor) which may be made to a desired amount.

These and other objects of our invention will be understood by those skilled in the art from the foregoing taken together with the following description and the drawings, in which Fig. 1 is an irregular vertical section taken on line 1—1 of Fig. 2;

Fig. 2 is a section taken on line 2—2 of Fig. 1;

Fig. 3 is a section taken on line 3—3 of Fig. 2;

Fig. 4 is a section taken on line 4—4 of Fig. 3;

Fig. 5 is a perspective view of a detail of the instrument;

Fig. 6 is a perspective view of the movable member and the locking mechanism;

Fig. 7 is a section taken on line 7—7 of Fig. 3;

Fig. 8 is a fragmentary vertical section of a detail of the lock mechanism taken on line 8—8 of Fig. 2;

Fig. 9 is a schematic showing of the lock mechanism in one position;

Fig. 10 is a schematic showing of the lock mechanism in another position;

Fig. 11 is a schematic showing of the lock mechanism in another position;

Fig. 12 is a schematic showing of the lock mechanism in still another position; and Fig. 13 is a schematic showing of the detail of the movable member.

The instrument is encased in case 1 and contains the frame member 2 which is rigidly held in the case by screws 3 and 4 passing through the end wall 5 of the case and by the screws 6 passing through the bracket 7 positioned at the opposite end of the case on the top 8 and abutting the other end wall 9 of the instrument case.

The frame 2 is a U-shaped member having legs 10 and 11 and transversely slotted at 12 at the base of the U-shaped member.

The armature member is made in two parts with an upper member 14 and a lower member 15 acting as a lever. The upper member is mounted in spaced relationship from the lower member by the legs 16 which are held securely on the upper face of the lower member by screws 18 passing into the tapped holes in the legs 16.

The upper member is stepped at one end, here called the front end, to distinguish from the opposite free end of the upper member, to form a step 18' in which is positioned a threaded bore 19 and an insulating pin such as a sapphire pin 20 (see Figs. 1, 2, and 6).

The lower member (see Figs. 1 and 6) is stepped at its front end 21 adjacent the front end of the upper member and is slotted at 22 for purposes to be described below. An L-shaped extension 23' is formed at the end of the member 15 for purposes to be described below.

A flat spring 24 is clamped horizontally between the clamping block 25 and the under face of frame 2 at the adjacent end of the frame by means of screws 26 passing through the clamping block 25 and the spring 24 into the frame. The narrower section 23 of spring 24 is clamped to the underneath side of the step 18' of the member 14 by means of a clamping block 27 (Figs. 1, 4, and 5) fixedly mounted on the adjacent ends of the legs 10 and 11 of the U-shaped frame member and clamping block 28 which clamps the spring extension 23 to the underneath side of the step 18' by means of a screw 29 which passes through the spring and into the threaded bore 19 in the underneath side of the step 18'.

Two vertically disposed springs 30, one on each side of the spring 24, are clamped between the clamping blocks 27 and 28, and the clamping block 25 and the inner face of the forward end of the frame member 2 by means of screws 31 passing through holes provided in springs 30. The spring 24 and the springs 30, perpendicularly disposed to 24, each act as hinges between the movable member 14 and the frame 2. The mutually coincidental lines of bending, positioned between 14 and 2, each separately acts as the axis of a hinge between 14 and 2.

A pin 32 similar to pin 20 is positioned in the under face of the clamping block 28 and disposed axially of the pin 20. The slot 22 is provided to make room for the motion of the pin 32, as will be described below. Similar pins 33 and 34 are coaxially mounted in and at the rear end of the frame 2 at the base and between the legs 10 and 11. The pin 34 is mounted in the top face and the pin 33 in the bottom face of the frame member 2. The line connecting the centers of the pins 20 and 34 and the line connecting the pin 32 and the pin 33 are each perpendicular to the faces of the flat springs 30 and parallel to the faces of the flat spring portions 24 and 23 which are perpendicular to the faces of the springs 30.

The terminal pins 35 and 35' are mounted on the upper faces of the frame and two similarly disposed terminal pins 36 and 36' are mounted on the lower face of the frame.

Strain sensitive wires 40, such as are used in the conventional unbonded strain gages heretofore referred to, are wound in a loop on pins 20 and 34 and the ends are each electrically connected to the terminals 35 and 35', respectively, which are mounted in insulated bushings 35a and 35'a in the frame.

Similar strain wires 42 are mounted in a loop on the pins 32 and 33 and the ends of the loop are electrically connected respectively to the terminal pins 36 and 36' mounted on insulated bushings 36a and 36'a (see Figs. 1 and 7) mounted in the lower face of the frame similarly to pins 35 and 35'.

Pins 35 and 36 are electrically connected to a terminal 37 and the pin 35' is electrically connected to terminal 38 and the pin 36' to terminal 39. These terminals 37, 38, and 39 may be electrically connected to a suitable connecting plug 41.

Mounted near the rear end of the frame are two legs 45, one on each side of the frame, passing freely through bores 41' in the bottom 43 of the case 1. The shanks of legs 45 are positioned in the bores 44 provided in the bottom of the adjacent end of the frame 2. The shanks may each be gripped in the bores by a set screw 46.

The legs are each formed with a knife edge 47 and the legs are aligned so the knife edges are on a straight line which is perpendicular to the line between the pin centers.

At the forward end of the lower frame members is positioned a bore into which is inserted the shank 48 of the leg 49 constructed similarly to the legs 45 and held in position by a set screw 48'. The leg projects through a bore 51 in the bottom 43. The knife edge 50 is aligned parallel to the knife edges 47. The center line of the leg 49 is perpendicular to the face of the spring 24 and passes through the central plane of the springs 30, i. e., is midway between the opposite flat faces of the springs 30. The center line of the leg 49 intersects on the center line of the instrument which is midway between the center lines of the legs 45. Thus the center lines of pins 20, 32, 33, and 34 and the center line of the leg 49 are coplanar and the knife edges of the legs 45 and 49 are parallel to each other and perpendicular to said plane.

As shown, auxiliary legs 54 and 55' are provided, projecting from the face of the front end 9 of the case. Thus a leg 54 is mounted in the bracket 7 by means of a set screw 55. A second leg 55' passes through a bore 56 in the end 9 and is secured in a suitable bore in the forward end of the L-shaped extension 23' of the lower member 15 by means of a set screw 57. The legs are provided with parallel knife edges 58. The center line of the leg 55' is perpendicular to the springs 30 and intersects the line of bending of the springs 30 between the block 27 and the frame, and the clamping blocks 25 and 28 and is within the central plane of the spring 24.

Positioned in the upper and lower faces of the frame member 2 and adjacent the free end of the upper member 14, one on each side thereof, are two stop screws 59 entering the slot 12.

The lower member 15 (see Figs. 2, 3, 6, 7) has a side extension 60 projecting toward the side wall 62 of the case. Rigidly mounted on the extension 60 is a U-shaped member 61 which is set on its side on the extension 60. A shaft 63 is rotatably mounted in the wall 62 and carries at one end a cam 64.

The arcuate cam surfaces 65, 66, 67, and 68, displaced 90° from each other, which are arcs of a cylinder centered at 69, are mounted eccentrically from the center 69' of the shaft 63, which is rotated by the knob 68'. The arcuate cam surfaces are formed on the square stud 70 whose flat faces 71, 72, 73, 74 are the chordal planes of the circular cylinder, connecting the adjacent arcuate cam surfaces.

The radius of the cylinder centered at 69 and containing the arcuate cam faces 65 to 68, inclusive, is equal to the vertical distance between the internal faces 75 and 76 of the U-shaped member.

The distance between the eccentric center 69 and the center 69' of the shaft is at least equal to the permissible deflection of the movable member when the instrument is used either in compression or tension measurement.

The detent locks 77, 78, 79, and 80 are disposed in angular relation to each other, as is illustrated in Figs. 9 to 12, inclusive.

The operation of the unit is as follows:

Assume that the instrument is to be used on a device which may be under either tension or compression. The knob is rotated to the position shown in Fig. 10 with the centers 69 and 69' on a line midway between and parallel to the faces 75 and 76. In this position the detent lock 77 locks the knob in position with the arcuate cam 66 against the upper face 76 and the arcuate cam face 68 against the lower cam face 75. In this position, the movable member 14 is disposed centrally between the stop studs 59, that is, the springs 24 and 30 are unstressed by any bending. No stress load is thus induced in the wires and the zero reading of the instrument is assured.

The instrument may then be set by hand or otherwise secured to any member which is to be stressed. Assume that this is done by setting the knife edges 50 and 47 on the member to be stressed. Because the center line of the leg 49 is coincident with the line of bending of the spring 24 and is in the central plane of the springs 30, any loading due to holding or clamping the instrument against the test member will not cause a flexure of the springs 24 or 30. No displacement of the movable member and no stress in the movable member or in the springs is introduced by the operation of mounting the instrument on the test member. The zero setting of the instrument is thus unchanged during mounting.

The knob 68' is then rotated 45° clockwise until the detent 78 locks the knob in the position shown on Fig. 9 with the faces of 74 and 72 parallel to the faces 76 and 75. The movable member is thus free to move between the stops 59.

When the test member is stressed, depending upon whether the surface which the legs rest on is in tension or compression, the legs 49 will either depart from or approach the leg 45. When this occurs the upper member 14, which is connected to the lower member 15, is rotated about the line of bending of the spring 24 which acts as a hinge with the axis of the hinge midway between the faces of the clamping members 27 and 28, and the complementary faces of the frame 2 and the clamping member 25.

It will be observed that the vertical springs 30 will also be flexed along a line of bending which is coincident with the line of bending of the spring 24. These springs, being perpendicular to the spring 24, act to impart a rigidity to the structure in all directions other than in the direction of bending of the spring 24. The arcuate line of motion of the pins 33 and 34 is thus always in the aforementioned plane and the instrument thus responds exactly to the separation of the legs. No vector of twist perpendicular to the face of the spring 24 is thus allowed sufficient to produce a component of twist perpendicular to the surface of the spring to materially affect the reading instrument when used as described above.

When the legs are made to separate, as when the surface is in tension, the movable member is pulled down, and the upper pin 20 is carried toward the pin 34, reducing the resistance of the wires 40 while the pin 32 is carried away from the pin 33, increasing the resistance of the wires 42. When the legs approach each other, as when the surface is in compression, the rotation of the pins and the variation in resistance are in the opposite direction, as will be readily understood from the above description.

It will be observed that the axis of the pins 20 and 32 is displaced to one side of the axis of the leg 49, and that the knife edge 50 is spaced downward from the hinge axis. A bell crank results and the pins 20 and 32 move through an angle whose tangent is a multiple of the degree of movement of the leg 49 to or from the leg 45. Thus, for example (and only to illustrate this multiplication, and not for purposes of limitation), the pin axis may be ⅛" from the line of bending and the knife edge ⅞" from line of bending, and the wires will be altered in length between the pins by a factor equal to one-seventh times the movement of the legs to or from each other. The multiplication factor results in a like multiplication in the change in resistance of the wire due to the movement of the knife edge.

The device as described above will report the change over a length equal to the distance between the legs 49 and 45 or between 54 and 55', i. e., when loaded. Since the absolute values of the linear distance between the knife edge 50 and the knife edge 47, i. e., the gage lengths, are known, and since by calibration the relationship between the absolute value of the change in separation of the legs to the output of the gage, i. e., net change in resistance, is known, the absolute value of the strain can be reported as displacement per unit length, directly in terms of the output of the gage.

It will be observed that with the test member in compression the legs 45 and 49 will approach each other and the movable member 14 will be tilted upwardly toward the upper stop screw 59. These set screws are set on calibration of the instrument to limit the permissible increase in tension of the wires on deflection of the gage. The lower wires 42 will be increased in tension, i. e., lengthened, while the upper wires 40 will be relaxed in tension, i. e., shortened. With the wires in a Wheatstone bridge balanced with the member 14 in neutral position, as described in connection with Fig. 10, the bridge will be unbalanced in a given direction as is readily determined from the calibrations of the gage.

If the test member is in tension, the legs 45 and 49 separate, i. e., move apart, the member 14 is tilted downwardly and the upper wires 40 are further stretched and the lower wires are relaxed in tension and the direction of imbalance of the Wheatstone bridge will be in a direction opposite to that described above where the gage is used to measure compression.

It will be observed, however, that the permissible range of the gage, i. e., the amount of elongation or compression which is measurable by the gage in such case is only that amount which will move the end of the movable member between the stops 59.

The lock mechanism described above increases the range by doubling the available motion of the movable member and therefore doubles the range of the instrument without changing the position of the stop studs 59, i. e., without exceeding the original limit of the increase in tension of the wires as is determined by the setting of the stop screws on calibration.

This is accomplished, for example, if the gage is used to measure tension, by deflecting the movable member to the extreme position which it can take when using the gage as a compression member, locking the gage in such position, and setting the gage on the wire as described above, balancing the Wheatstone bridge, and then unlocking the gage.

This is accomplished by rotating the knob 68' 45° clockwise from the position in Fig. 9 to the position shown in Fig. 11 or until the detent 79 locks the knob in the position shown in Fig. 11. In this position the cam face 65 is against the face 76. The face 65 is at a distance equal to the radius of the circle of which 65 is an arc plus the eccentricity of the circle, i. e., the separation of the centers 69 and 69'. The face 67 is against the lower face 75 and the U-shaped member and the movable member are thus deflected upwardly against the upper stop stud 59 and locked in this position. This is the position which the gage will take when the feet 49 and 45 are approaching the maximum distance permitted when the gage is used as a compression gage. The gage is then mounted as described above and the Wheatstone bridge balanced. The knob is then turned to the position shown in Fig. 9 by rotating the knob 68 counterclockwise 45°. The movable member is unlocked and free to move as described above. It will be seen then that the gage may be used to measure a range of extension, i. e., a separation of the legs 45 and 49, which will move the movable member from the upper to the lower stop. This is twice the distance which would be possible if the initial position of the gage had been with the movable member in the central position as was described in connection with Fig. 10. It will be noted that the vertical distance between the faces 74 and 76 and between 72 and 75 are at least equal to the total movement of the movable member between the stops 59.

In like manner, when the gage is to be used as a compression gage, the gage is locked with the movable member in the dotted position shown in Fig. 13 by rotating knob 68' 180° from the position shown in Fig. 11 to the position shown in Fig. 12. In this position the arcuate cam face 65 is against the face 75 and the arcuate cam face 67 is against the face 76. The instrument is thus locked in the extreme apart position of the legs 45 and 49 which is permitted by the setting of the stop studs 59. The gage is then set on the member whose compression is to be determined, the Wheatstone bridge balanced, and the knob 68' rotated 45° in either direction, i. e., clockwise or counterclockwise to the position shown in Fig. 9 or any other similar position when the flat faces 71 to 74, inclusive, are parallel and perpendicular to the faces 75 and 76 in a manner equivalent to Fig. 9. The movable member is thus unlocked and free to move on separation of the legs 49 and 45. The permissible separation is that which will move the movable member from the dotted position to the solid position as shown in Fig. 13. As described for the measurement of tension, this is a range of compression twice that which will be permitted when the starting position is the neutral position determined by the lock, as shown in Fig. 10.

The instrument reports, however, the average value of the strain existing over the initial distance between the knife edges 47 and 50 when the instrument is set on the test member. It is frequently desired to determine if such strain is uniform over this length. This may be accomplished by measuring the strain over a shorter gage length and to compare the strain thus determined with the strain reported over the longer gage length.

Means are provided on the instrument for measuring the strain over a gage length which is smaller than the gage length between legs 45 and 49. The shorter gage can thus be made to explore the region over which the strain is determined. Again it is sometimes desirable to measure strain in regions where the longer gage cannot fit.

We have provided in the gage of our invention means which may be used, if desired, to reduce the gage length of the instrument. The leg 54 is similar to legs 45 and 49. The leg 55' is mounted in the L-shaped extension 23'. The bore 56 is made sufficiently large, in the same manner as the bore 51, to permit lateral movement of the leg 55'. The center line of the leg 55' is perpendicular to the faces of the springs 30 and the line of bending of this spring and coplanar with the central plane of the flat spring 24. Thus the mounting of the instrument with legs 55' and 54 on the test material imposes no load, as was described in connection with the mounting of the instrument on the legs 45 and 49.

It will be seen that as the leg 55' moves freely inside the bore 56 and approaches or departs from the leg 54, as the test material is stressed the L-shaped extension 23' of the member 15 will cause the springs 30 to flex the movable members 14 and 15 to rotate about the coincident lines of bending of springs 30 and 24. This changes the resistance of the strain wires in a manner similar to the operation of the gage of greater gage length between 50 and 47.

The weight of the movable member is small and therefore the frequency of the gage may be made high. By weighting the arm 15, however, the frequency of the gage may be made low and adjusted to a desirable value.

While we have described our invention as applied to an electrical resistance gage, it is also applicable as well to mechanical, optical, acoustical, electric inductance as well as the electrical resistance type strain gages of the prior art.

In all of these devices, stops or other equivalent means are provided to limit the motion of the movable member either side of the position taken by the movable member when the gage is unloaded. The movable member of these gages may carry a U-shaped member and the four-position lock as described above, and this lock will lock the movable member into neutral, i. e., unloaded, position or in each of two extreme positions against each of the stops respectively or will unlock the gage in the same manner as described above. Such a lock will give to each of these other types of gage specified above the advantages and functions described herein for the strain wire gage used to illustrate the application of our invention.

While we have described a particular embodiment of our invention for the purpose of illustration, it should be understood that various modifications and adaptations thereof may be made within the spirit of the invention as set forth in the appended claims.

We claim:

1. A strain gage, comprising a frame, a movable member, a support for said movable member connected to said frame, said movable member being mounted on said support for motion relative to said frame and a releasable lock for holding said movable member in a load-free position with respect to said frame, said movable member being movable either side of said load-free position when said lock is released, a motion responsive device responsive to the relative movement of said gage, movable member and said frame, a pair of motion limit stops for limiting the motion of said movable member on either side of said load-free position, and a releasable lock for said movable member to hold said movable member against one of said stops.

2. A strain gage, comprising a frame, a movable member, a support for said movable member connected to said frame, said movable member being mounted on said support for motion relative to said frame and a releasable lock for holding said movable member in a load-free position with respect to said frame, said movable member being movable to either side of said load-free position when said lock is released, a motion responsive device responsive to the relative movement of said gage movable member and said frame, a pair of motion limit stops for limiting the motion of said movable member on either side of said load-free position, and a releasable lock for said movable member to hold the movable member selectively against one of said stops.

3. A strain gage, comprising a frame, a movable member, a support for said movable member connected to said frame, said movable member being movably mounted in said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a selective releasable lock to lock said movable member in load-free position midway between said stops, and a selective releasable lock for selectively locking said movable member against one of said stops.

4. A strain gage, comprising a frame, a movable member, a hinge support for said movable member connected to said frame, a releasable lock for holding said member on said hinge in a load-free position with respect to said frame, said movable member being movable to either side of said load-free position when said lock is released, a motion responsive device responsive to the relative movement of said movable member and said frame, a pair of motion limit stops for limiting the motion of said movable member on either side of said load-free position, and a releasable lock for releasably locking said movable member against one of said stops.

5. A strain gage, comprising a frame, a movable member, a hinge support for said movable member connected to said frame, a releasable lock for holding said member on said hinge in a load-free position with respect to said frame, said movable member being movable to either side of said load-free position when said lock is released, a motion responsive device responsive to the relative movement of said movable member and said frame, a pair of motion limit stops for limiting the motion of said movable member on either side of said load-free position, and a releasable lock for said movable member to lock said movable member selectively against one of said stops.

6. A strain gage, comprising a frame, a movable member, a hinge support for said movable member connected to said frame, a releasable lock for holding said member on said hinge in a load-free position with respect to said frame, said movable member being movable to either side of said load-free position when said lock is released, a motion responsive device responsive to the relative movement of said movable member and said frame, a pair of motion limit stops for limiting the motion of said movable member on either side of said load-free position, a selective lock for selectively locking said movable member in load-free position midway between said stops, said lock also including locking elements for selectively locking said movable member against one of said stops.

7. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a U-shaped member having parallel arms mounted on said movable member, a shaft rotatably mounted on said frame, a cam lock including a cam, said cam mounted on said frame between the arms of said U-shaped member, for rotation with said shaft concentric arcuate surfaces, spaced 90° apart upon a circle including the said arcuate cam faces, the center of said circle being spaced eccentrically from the center of rotation of said shaft, said cam including also two pairs of parallel plane chordal surfaces, one pair being perpendicular to the other pair and each plane surface connecting adjacent arcuate surfaces, the vertical distance separating the said parallel plane surfaces being less than the vertical distance between the arms of the said U-shaped member, the diameter of the circle including the said cam surfaces being positioned between and substantially equal to the vertical distance between the arms of said U.

8. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a U-shaped member having parallel arms mounted on said movable member, a shaft rotatably mounted on said frame, a cam lock mounted on said frame, said cam lock including a cam, said cam mounted between the arms of said U-shaped member, said cam mounted for rotation with said shaft having four concentric arcuate surfaces, spaced 90° apart upon a circle including the said arcuate cam faces, the center of said circle being spaced eccentrically from the center of rotation of said shaft, said cam including also two pairs of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of the circle including the said cam surfaces being positioned between and substantially equal to the vertical distance between the arms of said U, and the eccentricity of the displacement of the center of the circle and the center of rotation of said shaft being substantially equal to the distance of travel of said movable member from the central position between said stops to either of said stops.

9. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a U-shaped member having parallel arms mounted on said movable member, a shaft rotatably mounted on said frame, a cam lock mounted on said frame, said cam lock including a cam, said cam mounted between the arms of said U-shaped member, said cam mounted for rotation with said shaft having four concentric arcuate surfaces spaced 90° apart upon a circle including the said arcuate cam faces, the center of said circle being spaced eccentrically from the center of rotation of said shaft, said cam also including two pairs of parallel plane chordal surfaces, one pair being perpendicular to the other pair and each surface connecting adjacent arcuate surfaces, the vertical distance separating the said parallel plane surfaces being less than the vertical distance between the arms of the said U, the diameter of the said circle being positioned between and substantially equal to the vertical distance between the arms of said U-shaped member.

10. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a U-shaped member having parallel arms mounted on said movable member, a shaft rotatably mounted on said frame, a cam lock mounted on said frame said cam lock including a cam, said cam mounted between the arms of said U-shaped member, said cam mounted for rotation with said shaft having four concentric arcuate surfaces spaced 90° apart upon a circle including the said arcuate cam faces, the center of said circle being spaced eccentrically from the center of rotation of said shaft, two pairs of parallel plane chordal surfaces, one pair being perpendicular to the other pair and each surface connecting adjacent arcuate surfaces, the vertical distance separating the said parallel plane surfaces being less than the vertical distance between the arms of said U-shaped member, the diameter of said circle being positioned between and substantially equal to the vertical distance between the arms of said U, and the eccentricity of the displacement of the center of the circle and of the center of rotation of said shaft being substantially equal to the distance of travel of said movable member from the central position between said stops to either of said stops.

11. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a selective lock to hold said movable member in load-free position midway between said stops, said lock including a selective hold to lock said movable member against one of said stops, said lock including a U-shaped member having parallel arms mounted on said movable member, a shaft rotatably mounted on said frame, a cam mounted on said shaft, between the arms of said U-shaped member, for rotation with said shaft, said cam having four concentric arcuate faces, each spaced 90° apart upon a circle including the said arcuate cam faces, the center of the circle including said arcuate cam surfaces being spaced eccentrically from the center of rotation of said shaft, said cam including also two pair of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of said circle including the said cam surfaces being positioned between and substantially equal to the vertical distance between the arms of said U.

12. A strain gage, comprising a frame, a movable member, a support for said movable member connected to said frame, said movable member being movably mounted on said support for motion relative to said frame in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a selective lock to hold said movable member in load-free position midway between said stops, said lock including a selective hold to lock said movable member against one of said stops, said lock including a U-shaped member having parallel arms mounted on said movable member, a shaft rotatably mounted on said frame, a cam mounted on said shaft, between the arms of said U-shaped member, for rotation with said shaft, said cam having four concentric arcuate surfaces spaced 90° apart upon a circle including the said arcuate cam faces, the center of the circle including said arcuate cam surfaces being spaced eccentrically from the center of rotation of said shaft, said cam including also two pairs of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of the circle including the said cam surfaces being positioned between and substantially equal to the vertical distance between the arms of said U, and the eccentricity of the displacement of the center of the circle and the center of rotation of said shaft being substantially equal to the distance of travel of said movable member from the central position between said stops to either of said stops.

13. A strain gage, comprising a frame, a movable member, a hinge support for said movable member connected to said frame, said member being mounted on said hinge in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a releasable lock to lock said movable member against one of said stops, said lock including a U-shaped member having a parallel arms mounted on said movable member, a shaft rotatably mounted on said frame, a cam mounted on said shaft, between the arms of said U-shaped member, for rotation with said shaft, said cam having four concentric arcuate faces, spaced 90° apart upon a circle including said arcuate cam surfaces, the center of said circle being spaced eccentrically from the center of rotation of said shaft, said cam including also two pairs of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of said circle being positioned between and substantially equal to the vertical distance between the arms of said U.

14. A strain gage, comprising a frame, a movable member, a hinge support for said movable member connected to said frame, said member being mounted on said hinge in a load-free position with respect to said frame, said movable member being movable to either side of said load-free position, a motion responsive device responsive to the relative movement of said movable member and said frame, a pair of motion limit stops for limiting the motion of said movable member on either side of said load-free position, a releasable lock to lock said movable member against one of said stops, including a U-shaped member having parallel arms mounted on said movable member, a shaft rotatably mounted on said frame, a cam mounted on said shaft, between the arms of said U-shaped member, for rotation with said shaft, said cam having four concentric arcuate faces spaced 90° apart upon a circle including said arcuate cam surfaces, the center of said circle being spaced eccentrically from the center of rotation of said shaft, said cam including also two pairs of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of said circle being positioned between and substantially equal to the vertical distance between the arms of said U, and the eccentricity of the displacement of the center of the circle and the center of rotation of said shaft being substantially equal to the distance of travel of said movable member from the central position between said stops to either of said stops.

15. An electrical resistance wire strain gage, comprising a frame, a movable member, a spring hinge, a connector for securely connecting said spring hinge to said frame, a second connector for securely connecting said spring hinge to said movable member at one end of said movable member, said connectors being spaced from each other, one on each side of a line of bending of said spring hinge, a gage supporting leg connected to and depending from said movable member, the axis of said leg substantially intersecting the line of bending perpendicularly, a second gage supporting leg connected to said frame and spaced from said first leg, said legs being adjustably mounted on said gage for altering the spacing between said supporting legs, wire supports on said frame, wire supports on said movable member, an electrical resistance strain wire connected to said supports, stops mounted on said frame on each side of said movable member, and means for releasably locking said movable member against one of said stops.

16. An electrical resistance wire strain gage, comprising a frame, a movable member, a spring hinge, a connector for securely connecting said spring hinge to said frame, a second connector for securely connecting said spring hinge to said movable member at one end of said movable member, said connectors being spaced from each other, one on each side of a line of bending of said spring hinge, a gage supporting leg connected to and depending from said movable member, the axis of said leg substantially intersecting the line of bending perpendicularly, a second gage supporting leg connected to said frame and spaced from said first leg, said supporting legs being adjustably mounted with respect to each other, wire supports on said frame, wire supports on said movable member, an electrical resistance strain wire connected to said supports, stops mounted on said frame on each side of said movable member, and a releasable lock for locking said movable member selectively against one of said stops.

17. An electrical resistance wire strain gage, comprising a frame, a movable member, a spring hinge, a connector for connecting said spring hinge securely to said frame, a second connector for holding said spring hinge securely to said movable member at one end of said movable member, said connectors being spaced from each other, one on each side of a line of bending of said spring hinge, a gage supporting leg connected to and depending from said movable member, the axis of said leg substantially intersecting the line of bending perpendicularly, a second gage supporting leg connected to said frame and spaced from said first leg, said legs being adjustably mounted for alteration of the spacing between said supporting legs, wire supports on said movable member and on said frame, an electrical resistance strain wire connected to said supports, stops mounted on said frame on each side of said movable member, a selective lock for locking said movable member in position midway between said stops, said lock also locking said movable member selectively against one of said stops.

18. An electrical resistance wire strain gage, comprising a frame, a movable member, a flat spring, a connector for holding said spring securely to said frame, a second connector for holding said spring securely to said movable member at one end of said movable member, said connectors being spaced from each other, one on each side of a line of bending of said spring, a second flat spring positioned perpendicularly to the first mentioned flat spring, a third connector for holding said second flat spring securely to said frame, a fourth connector for holding said flat spring securely to said movable member at said end of said movable member, said last two named connectors being spaced from each other on either side of a line of bending of said second mentioned spring, the lines of bending of both of said springs being substantially coincident, a gage supporting leg connected to and depending from said movable member, the axis of said leg substantially intersecting the lines of bending perpendicularly, a second gage supporting leg connected to said frame and spaced from said first leg, an adjustable mount for one of said legs for altering the spacing between said supporting legs, wire supports on said frame, wire supports on said movable member, an electrical resistance strain wire connected to said supports, stops mounted in said frame on each side of said movable member, and a releasable lock to lock said movable member against one of said stops.

19. An electrical resistance wire strain gage, comprising a frame, a movable member, a flat spring, a connector for connecting said spring securely to said frame, a second connector for holding said spring securely to said movable member at one end of said movable member, said connectors being spaced from each other, one on each side of a line of bending of said spring, a second flat spring, positioned perpendicularly to the first mentioned flat spring, a third connector for holding said second flat spring securely to said frame, a fourth connector for holding said flat spring securely to said movable member at said end of said movable member, said last two named connectors being spaced from each other on either side of a line of bending of said second mentioned spring, the lines of bending of both of said springs being substantially coincident, a gage supporting leg connected to and depending from said movable member, the axis of said leg substantially intersecting the lines of bending, a second gage supporting leg connected to said frame and spaced from said first leg, an adjustable mounting for one of said legs for alteration of the spacing between said supporting legs, wire supports on said frame, wire supports on said movable member, an electrical resistance strain wire connected to said supports, stops mounted in said frame on each side of said movable member, and a releasable lock to lock said movable member against one of said stops.

20. An electrical resistance wire strain gage, comprising a frame, a movable member, a flat spring, a connector for holding said spring securely to said frame, a second connector for holding said spring securely to said movable member at one end of said movable member, said connectors being spaced from each other, one on each side of a line of bending of said spring, a second flat spring positioned perpendicularly to the first mentioned flat spring, a third connector for holding said second flat spring securely to said frame, a fourth connector for holding said flat spring securely to said movable member at said end of said movable member, said last two named connectors being spaced from each other on either side of a line of bending of said second mentioned spring, the lines of bending of both of said springs being substantially coincident, a gage supporting leg connected to and depending from said movable member, the axis of said leg substantially intersecting the line of bending perpendicularly, a second gage supporting leg connected to said frame and spaced from said first leg, an adjustable mounting for one of said legs for alteration of the spacing between said supporting legs, wire supports on said frame, wire supports on said movable member, an electrical resistance strain wire connected to said supports, stops mounted in said frame on each side of said movable member, a selective lock to lock said movable member in position midway between said stops, and also including a selective lock for selectively locking said movable member against one of said stops.

21. An electrical resistance wire strain gage, comprising a frame, a movable member, a spring hinge, a connector for holding said spring hinge securely to said frame, a second connector for holding said spring hinge securely to said movable member at one end of said movable member, said connectors being spaced from each other, one on each side of a line of bending of said spring hinge, a gage supporting leg connected to and depending from said movable member, the axis of said leg substantially intersecting the line of bending perpendicularly, a second gage supporting leg connected to said frame and spaced from said first leg, an adjustable mounting for one of said legs for altering the spacing between said supporting legs, wire supports on said frame, wire supports on said movable member, an electrical resistance strain wire connected to said supports, stops mounted in said frame on each side of said movable member, a U-shaped member having parallel arms mounted on said movable member, a shaft rotatably mounted on said frame, a cam mounted on said shaft, between the arms of said U-shaped member, for rotation with said shaft, said cam having four concentric arcuate surfaces each spaced 90° apart upon a circle including the said arcuate cam faces, the center of the circle including said arcuate cam surfaces being spaced eccentrically from the center of rotation of said shaft, said cam including two pairs of parallel plane chordal surfaces, one pair being perpendicular to the other and each surface connecting adjacent arcuate surfaces, the vertical distance separating the said parallel plane surfaces being less than the vertical distance between the arms of the said U-shaped member, the diameter of the circle including the said cam surfaces being positioned between and substantially equal to the vertical distance between the arms of said U-shaped member.

22. An electrical resistance wire strain gage, comprising a frame, a movable member, a flat spring, a connector for holding said spring securely to said frame, a second connector for holding said spring securely to said movable member at one end of said movable member, said connectors being spaced from each other, one on each side of a line of bending of said spring, a second flat spring, positioned perpendicularly to the first mentioned flat spring, a third connector for holding said second flat spring securely to said frame, a fourth connector for holding said flat spring securely to said movable member at said end of said movable member, said last two named connectors being spaced from each other on either side of a line of bending of said second mentioned spring, the lines of bending of both of said springs being substantially coincident, a gage supporting leg connected to and depending from said movable member, the axis of the leg substantially intersecting the lines of bending perpendicularly, a second gage supporting leg connected to said frame and spaced from said first leg, an adjustable mounting for one of said legs for altering the spacing between said supporting legs, wire supports on said frame, a wire supports on said movable member, an electrical resistance strain wire connected to said supports, a U-shaped member having parallel arms mounted on said movable member, a shaft rotatably mounted on said frame, a cam mounted on said shaft, between the arms of said U-shaped member, for rotation with said shaft, said cam having four concentric arcuate surfaces spaced 90° apart upon a circle including the said arcuate cam faces, the center of the circle including said arcuate cam surfaces being spaced eccentrically from the center of rotation of said shaft, said cam including also two pairs of parallel plane chordal surfaces, one pair being perpendicular to the other pair and each surface connecting adjacent arcuate surfaces, the vertical distance separating the said parallel plane surfaces being less than the vertical distance between the arms of the said U-shaped member, the diameter of the circle including the said cam surfaces being positioned between and substantially equal to the vertical distance between the arms of said U-shaped member.

23. A strain gage, comprising a frame, a support on said frame, a movable member mounted on said support for motion relative to said frame from a load-free position of said member with respect to said frame, a releasable lock, said lock including means cooperating with said member for locking said movable member on said support in said load-free position against displacement from said load-free position and means for releasing said member for displacement from said load-free position, and a motion responsive device responsive to the motion of said member on support from said load-free position.

24. A strain gage, comprising a frame, a support on said frame, a movable member mounted on said support for motion relative to said frame from an initial position of said member with respect to said frame, on one side of a load-free position of said member a releasable lock, said lock including means cooperating with said member for locking said movable member on said support in said initial position on one side of the load free position against displacement from said initial position and means for releasing said member for displacement from said initial position, and a motion responsive device responsive to the motion of said member on said support from said initial position.

25. A strain gage, comprising, a frame, a movable member, a hinge between said movable member and said frame, said hinge mounted between said frame and said movable member, the axis of said hinge being positioned between said member and said frame, a gage-supporting leg connected to and depending from said movable member, the axis of said leg substantially intersecting the axis of said hinge, a second gage-supporting leg connected to said frame and spaced from said first leg, and a motion responsive device connected to said movable member responsive to the motion of said movable member.

26. A strain gage, comprising a frame, a movable member, a spring hinge, a connector for securely connecting said spring hinge to said frame, a second connector for securely connecting said spring hinge to said movable member at one end of said movable member, said connectors being spaced from each other, one on each side of a line of bending of said spring hinge, a gage supporting leg connected to and depending from said movable member, the axis of said leg substantially intersecting the line of bending, a second gage supporting leg connected to said frame and spaced from said first leg, and a motion responsive device connected to said movable member responsive to the motion of said movable member.

27. A strain gage comprising a frame, a movable member, a gage supporting leg connected to said frame, a second gage supporting leg connected to said movable member, a flat spring hinge connecting said movable member and said frame having a locus of bending between said frame and said movable member, said second gage supporting leg having an axis substantially intersecting said locus of bending, and means responsive to the motion of said movable member.

References Cited in the file of this patent

UNITED STATES PATENTS

| 1,456,938 | Schoof | May 29, 1923 |
| 1,638,425 | Whittemore | Aug. 9, 1927 |
| 2,036,458 | Carlson | Apr. 7, 1936 |
| 2,197,198 | Street | Apr. 16, 1940 |
| 2,331,779 | Hjarpe et al. | Oct. 12, 1943 |
| 2,543,429 | Wood | Feb. 27, 1951 |
| 2,581,264 | Levesque | Jan. 1, 1952 |

FOREIGN PATENTS

| 127,311 | Switzerland | Aug. 16, 1928 |